E. F. HOWE.
Improvement in Holdback-Irons.

No. 130,640.                      Patented Aug. 20, 1872.

Witnesses:                           Inventor:

Henry Michael                       Edward F. Howe
Shepherd H. Wheeler

UNITED STATES PATENT OFFICE.

EDWARD F. HOWE, OF DOWAGIAC, MICHIGAN.

IMPROVEMENT IN HOLD-BACK IRONS.

Specification forming part of Letters Patent No. 130,640, dated August 20, 1872.

I, EDWARD F. HOWE, of Dowagiac, in the county of Cass and State of Michigan, have invented certain Improvements in Hold-Back Irons, of which the following is a specification:

The nature of my invention relates to the construction of a device for holding back vehicles drawn by one horse, and is self-detaching; the object being to insure great safety in holding back vehicles, and facilitate the operation of hitching and detaching horses from vehicles.

Figure 1:
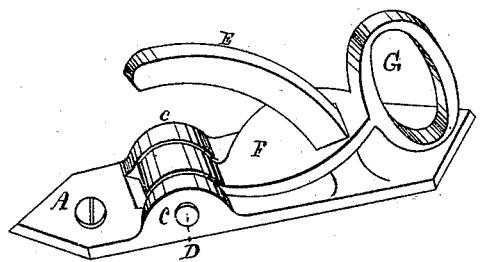
Figure 2:
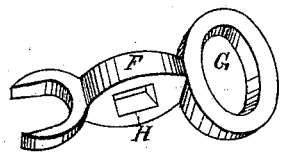

In the accompanying drawing, making a part of this specification, Figure 1 shows a perspective view of a device embodying my invention. Fig. 2 shows a slotted lever forming a part of the same.

Letters of reference are marked on the drawing, of which A represents a metallic plate. This plate has screw-holes or any suitable provision for fastening to the thill at the usual point of fastening hold-backs to thills, and is provided with lugs C C. These lugs support the pivot D. A circular hook, E, projects from the upper side of the rear end of the plate A. This hook is quadrant-shaped, and describes a circle concentric with the pivot D, the upper end pointing forward. F represents a slotted lever, the forked end of which fits astride of the pivot D and between the lugs C C. The other end of this lever is provided with the loop-hole G. In this loop-hole one end of the hold-back strap is fastened, the other end being fastened to the breeching of the harness in the usual manner. Thus the lever F is permanently attached to the harness and need not be detached therefrom. At about midway of the lever F an eye, H, is provided, suitable to receive the hook E, when the forked end of lever F is inserted between the lugs C C and against the pivot D. In this position the lever F may be swung back, passing the hook E through the eye H. Now it will be seen that if the tugs of the harness are hitched to the vehicle in the usual manner the lever F cannot be detached without first detaching the tugs. Thus a permanent hold-back is secured, and all that is required to disengage the horse from the vehicle is to detach the tugs in the usual manner, when the lever F will swing forward and disengage from the hook E and pivot D as the horse moves away from the vehicle, thus facilitating the work of liberating the horse from the thills.

Having thus fully described my invention, what I claim is—

In a hold-back made in two parts, A and F, the lugs C C with pivot D and slotted lever F, when constructed, arranged, and combined as and for the purposes set forth.

EDWARD F. HOWE.

Witnesses:
HENRY MICHAEL,
SHEPHERD H. WHEELER.